July 3, 1956
B. COOPER
2,753,113
TOLL CHECKING SYSTEM
Filed Dec. 19, 1952
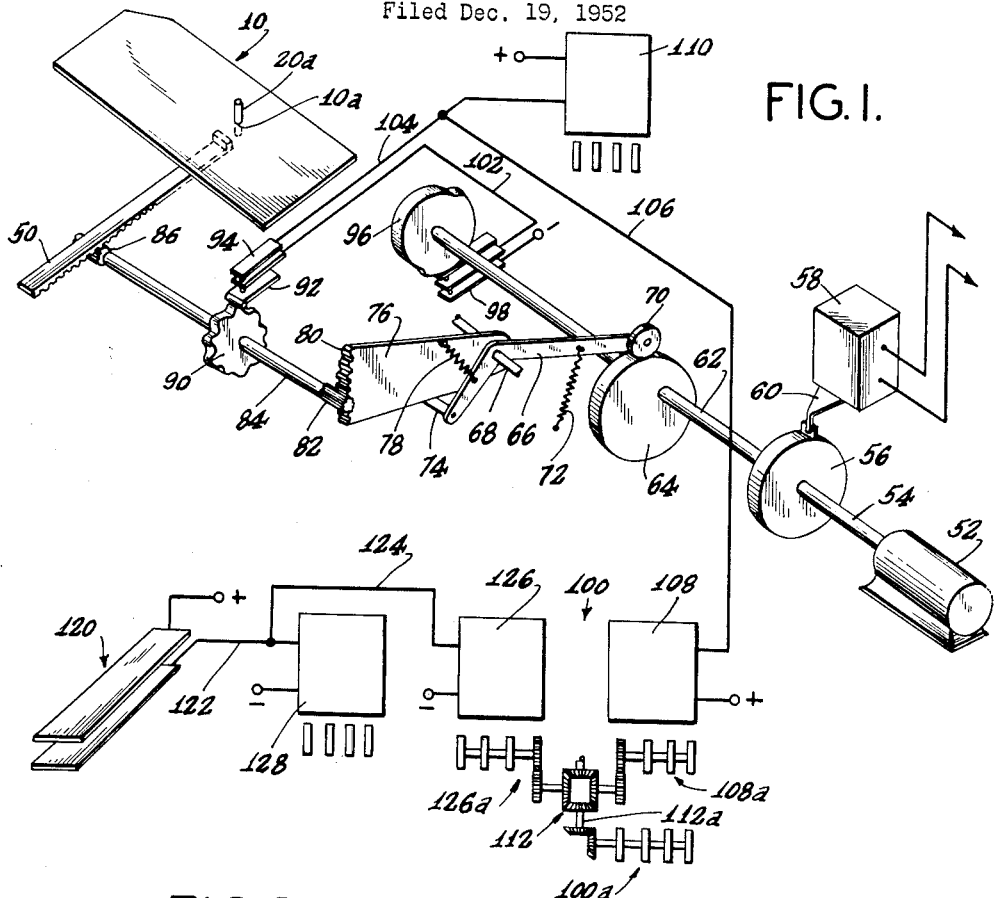
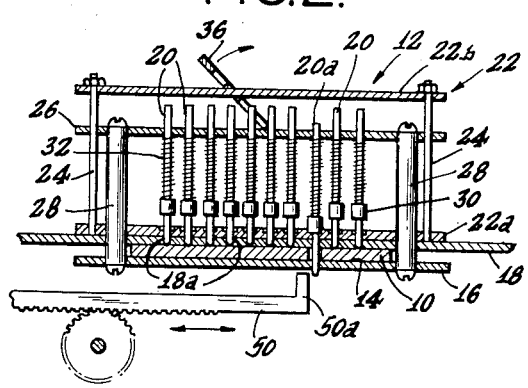
INVENTOR.
BENJAMIN COOPER
BY
J. B. Felshin
ATTORNEY.

United States Patent Office 2,753,113
Patented July 3, 1956

2,753,113

TOLL CHECKING SYSTEM

Benjamin Cooper, Brooklyn, N. Y., assignor to Research Electronics & Devices Co., Inc., Bayonne, N. J., a corporation of New Jersey Application December 19, 1952, Serial No. 327,023

6 Claims. (Cl. 235—61.7)

This invention relates to toll checking systems.

Heretofore toll systems have been inaugurated on the barrier principle, wherein an obstacle or a toll house is positioned so that tolls must be paid before access is gained to the toll facilities. This barrier system is not feasible for use on the new type superhighway or turnpike that have been devised as the most simple expedient for building adequate roads for the increasing density of traffic. Customarily these roads are authorized to be built on a self-liquidating basis, wherein the collection of tolls pays for the initial cost and upkeep of the road. The barrier type toll system is readily applicable to bridges, tunnels, etc., wherein there is but one entrance and one exit. However, in the case of the turnpike, the multitude of entry and exit points prohibits the use of this barrier system. In its place there has been devised a system wherein toll rate cards are issued to each vehicle driver upon entering any one of the entry points. The toll rate card is validated wtih pertinent data such as the identification of the entry point, the classification of the vehicle, the issuing toll collector's identification, and other related data. The vehicle driver surrenders the toll rate card to a toll collector on duty at his exit point and pays an appropriate toll based upon mileage and vehicle classification. The card is then revalidated with pertinent data relating to the exit point, and that card must be surrendered by the collector to the authorities along with the toll revenue that is collected. It may be pointed out that toll roads of this type are generally available to all kinds of vehicular traffic. Thus, each type of vehicle falls within a general classification, such as private automobiles in one classification, commercial trucking vehicles in another classification, and commercial passenger vehicles in still another classification.

The general classifications are further subdivided into specific classifications which are determined by the number of axles that are carried by the vehicle. Each classification has a different rate of toll revenue and with the variable mileage, a multitude of differing tolls may be charged. The axle classification is provided as a means for counting the vehicles that pass through the toll facilities and as a means for accounting for the toll revenue that is charged to the vehicles. Conventionally there is provided a treadle at each toll station over which a vehicle must roll when entering or departing from the toll facilities. Separate treadles are provided, of course, for entering vehicles and for exiting vehicles, so that a proper count may be maintained. The multitude classification relative to the axle count introduces a possibility of surreptitious practices such as the collecting of a certain toll and the turning in by the collector of a lower toll. This is possible since differing classifications of vehicles may have the same axle count, and further, the extra axle on a vehicle may be incorrectly accounted for. For example, two passenger cars may pass through the toll facilities, thereby recording on the treadle counter four axle counts. A two axle commercial trucking vehicle may then pass through the facilities, and the collector, instead of registering this last vehicle as its proper classification, may take the high toll that he has collected from the commercial vehicle driver and his toll rate card and retain them in his possession. The treadle axle counter now has a surplus of two counts. However, the toll collector may state that these extra counts were the result of the two passenger vehicles each having single axle trailers. The small charge for the trailers would be turned in but the difference would be retained by the collector for his own personal use. Such surreptitious practices are not possible when the present invention is employed in a toll checking system.

The toll rate card is customarily validated in a machine which imprints the pertinent data thereon. The practice is to revalidate the card with further pertinent data when the card is surrendered and the toll is paid.

The present invention provides a means whereby a toll rate card, preperforated with codal data representative of a specific number of axles, is sensed when it is inserted in a machine for revalidation and a counter actuated accordingly. Such a machine is not shown in the accompanying drawings and forms no part of the invention other than to provide a framework for the mechanism hereinafter described in detail. Such a machine is conventional, and it is deemed unnecessary to disclose in detail the elements thereof.

The present invention provides a means for counting the axle count that is preperforated in the toll rate card and the axle count resulting from the vehicle actuation of the treadle.

Another object is to provide means that will readily indicate a difference, if any, that exists between the two counts.

Yet another object is to provide means for sensing the axle count perforation in a toll rate card and controlling means to actuate a counter in accordance with the location of the axle count perforation in a toll rate card.

Other ancillary objects will be, in part, hereinafter apparent and, in part, hereinafter pointed out.

In the drawings:

Fig. 1 is a schematic view of the toll rate card axle counting means and the treadle actuated axle counting means.

Fig. 2 is a side elevation of the sensing means illustrating the sensing means in its lowermost and controlling position.

Fig. 3 is a side elevation of the sensing means in its uppermost or normal position.

Fig. 4 is a detailed view of the sensing means actuating member that positions the sensing means in the respective controlling and normal positions.

Referring to the drawings in detail, 10 generally designates a tool rate card. This card is of similar shape and size to that utilized in conventional statistical business machines. Card 10 is perforated with an aperture 10A that codally represents a specific number of axles in any classification. Aperture 10A is adapted to be sensed by a sensing mechanism generally designated as 12, Figs. 2 and 3. Sensing mechanism 12 is provided with a chamber 14 that is adapted to receive the toll rate card therein. Chamber 14 is formed with a lower wall 16 and a roof 18. The roof 18 of the chamber 14 is perforated with a plurality of apertures 18A in which the ends of a plurality of sensing pins 20 reside. Sensing pins 20 are slideably mounted at their lower end in the lower wall of a cage generally designated as 22, that is adapted to reciprocate in a vertical plane. Cage 22 comprises the aforesaid lower wall 22A, a parallel spaced upper wall 22B and plural wall spacers 24. The upper ends of the sensing pins 20 are slideably mounted in a perforated plate designated as 26. Plates 26 and 16 are retained in spaced coaligning relation by spacers 28. The lower wall 22A of cage 22 is further provided with coaligning apertures that are adapted to receive spacers 28 therein whereby cage 22 may vertically slide thereon. Each of the sensing pins 20 is provided with a boss 30 of relatively greater diameter than the diameter of the coaligning apertures in the respective plates 22A and 26. A coil spring 32 is circumjacently disposed around each sensing pin 20 with one end abutting against the boss 30 and the other end abutting against the under side of plate 26. Thus, sensing pins 20 are normally urged by springs 32 downwardly and are limited in their downward travel by the bosses 30.

As shown in Fig. 4, means are provided to lower and elevate cage 22 and toward this end there is provided a member 36 having a slot 38 therein which defines a pair of spaced tines 40. Further, each tine 40 is recessed to provide an inner shoulder 42 at one end and an inwardly extending slot 44 at its other end. Slot 44 is of such thickness as to receive the upper cage wall 22B therein. When so disposed the shoulders 42 rest upon the plate 26 of the sensing pin assembly. With the member 36 disposed in a vertical upright position such as shown in Fig. 3, the cage 22 is raised to its uppermost position wherein all of the sensing pins are lifted out of engagement with the coaligning apertures in the perforated plate 18. With the cage raised in its uppermost position, the card 10 is free to slide within the chamber 14 to its correct registering position. The manual displacement of the member 36 to the angular position shown in Fig. 2 permits the cage to descend under the pressure of the springs 32, thereby permitting sensing pins 20 to engage card 10. The particular sensing pin that is in alignment with the preperforated aperture in the card, passes through said aperture and extends below said card. As shown in Fig. 2, the sensing pin identified as 20A has assumed this latter position. The lower tip of the sensing pin 28 will now limit the travel of sensing rack bar 50.

Referring to Fig. 1, means are provided to move the rack bar 50 along a predetermined lateral path until the raised protrusion 58 engages one of the sensing pins 20. To this end there is provided an electric motor 52 having its shaft 54 coupled to a one-revolution clutch generally designated as 56. Clutch 56 is conventional and is not described in detail herein, but reference to Patent No. 2,340,581 discloses such a clutch in detail. Clutch 56 is controlled by an electromagnet 58 which has an armature 60 normally disposed to engage the engaging member of the clutch. Thus, when electromagnet 58 is energized, the armature 60 is attracted upwardly momentarily to release clutch 56 for engagement with the continuously rotating shaft 54. A coaligning shaft 62 rotatable with the free side of the clutch 56 is then rotated through one revolution until the controlling member on the clutch 56 is once more engaged by armature 60 of the electromagnet 58.

An eccentric cam 64 is mounted on and rotatable with shaft 62. A bell crank 66 centrally pivoted at 68 has on one arm, a follower roller 70 which is adapted to ride on the periphery of cam 64. A spring 72 maintains roller 70 in engagement with said cam in the well known manner. The opposite arm of bell crank 66 has a pin 74 secured thereon. Also pivotally mounted on shaft 68 is a gear sector 76 which is urged by means of spring 78 to rest upon the pin 74 carried by the bell crank 66. Sector 76 is provided with teeth 80 which are disposed in engagement with a pinion 82 formed on a shaft 84. Thus, rotation of shaft 62 and cam 64 will rotate bell crank 66 counterclockwise around the pivot shaft 68. The teeth 80 of sector 76 thereby rotate shaft 84 in a clockwise direction. Shaft 84 has thereon a pinion 86 that is disposed in meshing engagement with the teeth of rack sensing bar 50. Thus, clockwise rotation of shaft 84 moves the rack bar 50 inwardly until said rack bar engages a sensing pin 20. When so engaged, the rotation of shaft 84 is arrested and the spring 78 is increasingly tensioned while the bell crank 66 continues counterclockwise rotation to its maximum degree.

Means are provided to measure electrically the distance traveled by the rack bar 50 before it is arrested by the depressed sensing pin. To this end there is provided a pulsing cam 90 affixed to and rotatable with shaft 84. A detent 92 is adapted to be actuated by the rotation of the pulsing cam 90.

A normally open switch 94 is adapted to be alternately opened and closed by the detent 92 a number of times corresponding to the angle of rotation of pulsing cam 90. Switch 94 actuates counting means hereinafter described in detail.

Means are provided to control the pulsing operation to the initial half of a cycle of rotation of an eccentric cam 64. To this end there is provided a timing cam 96 having one-half of the periphery thereof raised to form a high dwell which controls a switch 98. Switch 98 is of the normally-open type and is closed upon the engagement of the high dwell on cam 96 therewith. Timing cam 96 is so positioned to close switch 98 for the first half of a cycle of rotation of shaft 62. Switches 98 and 94 are disposed in a series circuit hereinafter described in detail.

A differential counter 100 of the electromagnetic type is provided to register the counts represented by the perforated aperture in card 10. A circuit extends from a negative source of supply through switch 98, over conductor 102, through switch 94, over conductors 104, 106 to one terminal of the coil 108 of the differential counter 100. The other terminal of coil 108 is connected to a source of positive supply. Thus, with switch 98 in closed position, the pulsing of switch 94 by pulsing cam 90 will energize coil 108 a like number of times to add a corresponding count thereon. A second counter may be included in the circuit such as shown at 110 for totalizing the pulse counts by itself. Fundamentally, counters 100 and 110 are of the conventional type such as disclosed in Patent No. 2,185,724 issued January 2, 1940 to applicant, and are completely described in said patent, and therefore need not be described in detail herein. Counter 100 differs from the counters in the cited patents only in that a differential mechanism 112 is provided for reasons hereinafter appearing. Differential mechanism 112 consists of the usual input shafts, the differential cage and the differential output shaft. In this instance, each of the input shafts are driven by the respective counters.

Also shown in Fig. 1 is a treadle generally designated as 120 having two contact strips spaced one from the other and adapted to be closed by the wheels of the vehicle rolling thereover. Such a treadle is completely disclosed in the Patent No. 2,165,227 issued July 11, 1939 to applicant, and need not be described in detail herein. One contact of the treadle strip is connected to a source of positive supply while the other contact is connected by conductors 122, 124 to coil 126 of differential counter 100. The other terminal of coil 126 is connected to a source of negative supply. Analogously, a separate totalizing counter designated as 128 may be included in the circuit to totalize the individual axle counts if so desired. Counter 128 is similar to the counter 110 and is similar to that disclosed in the cited patent and need not be described in detail herein. The differential counter 100 is conventional and has a plurality of counter wheels thereon that accumulate the respective counters. Counter wheels 126A accumulate the axle count registered by the treadle 120. Counter wheels 108A accumulate the axle count registered by the aperture in card 10. The differential mechanism 112 which is conventional in design has the output shaft 112A thereof coupled through bevelled gears to a plurality of counter wheels designated as 100A. These counter wheels will, through the differential mechanism 112, indicate any difference that may be present between the count on counter wheels 126A and the count on counter wheels 108A.

Thus, it is readily evident that there has been conceived a device that is efficient and well adapted to meet the conditions of practical use.

The invention claimed is:

1. In combination, counting means, a treadle, means controlled by said treadle to actuate said counting means each time the wheels on an axle of a vehicle roll thereover to count the axles of vehicles rolling over the treadle, a second counting means, card sensing means, means controlled by the card sensing means to actuate said second counting means, differential means, comprising a pair of input shafts and an output shaft, means to connect said first and second counting means to said input shafts, respectively, and means connected to the output shaft to count the difference in the count of the first and second counting means.

2. In combination, counting means, a treadle, means controlled by said treadle to actuate said counting means each time the wheels on an axle of a vehicle roll thereover to count the axles of vehicles rolling over the treadle, a second counting means, card sensing means, means controlled by the card sensing means to actuate said second counting means, a differential mechanism controlled by said first and second counting means, and means controlled by said differential mechanism to count the difference between the counts of said first and second counting means.

3. In combination, a differential counter having a first counting means and a second counting means thereon, a third counting means differentially responsive to said first and second counting means, a treadle, means controlled by said treadle to actuate said first counting means, card sensing means adapted to sense a perforation in a card representative of a predetermined count, means to actuate said card sensing means, and means controlled by said card sensing means to actuate said second counting means.

4. In combination, card sensing means, means to actuate said card sensing means to sense a perforation in a card, pulsing means, means controlled by said sensed sensing means to actuate said pulsing means, a counter responsive to said pulsing means to count thereon a count corresponding to the sensed position of the card perforation, a second counter, a treadle, means to actuate said second counter each time said treadle is actuated, a differential mechanism interconnecting said first and second counters and actuatable thereby, and counting means responsive to said differential mechanism to count the difference between the counts of said first and second counters.

5. In combination, a treadle, counting means controlled by said treadle to count each treadle actuation, a second counting means, card sensing means, means controlled by said card sensing means to actuate said second counting means, differential means controlled by said first and second counting means, and a third counting means responsive to said differential means to count thereon the difference of the counts of said first and second counting means.

6. In combination, a treadle switch, an electromagnetically operated counter, means to actuate said counter each time the treadle switch is actuated, a second electromagnetically operated counter, card sensing means, pulsing means controlled by said card sensing means, means controlled by said pulsing means to actuate said second counter, differential means controlled by said first and second counters a third counter, and means controlled by said differential means to actuate said third counter to count the difference between the counts of said first and second counters.

References Cited in the file of this patent

UNITED STATES PATENTS

| | | |
|---|---|---|
| 1,247,899 | Tallmadge | Nov. 27, 1917 |
| 1,926,878 | McFall | Sept. 12, 1933 |
| 2,644,150 | Burn | June 30, 1953 |